United States Patent [19]

Lloyd

[11] Patent Number: 4,590,133

[45] Date of Patent: May 20, 1986

[54] BEARING MATERIAL

[75] Inventor: Kenneth Lloyd, Grosse Pointe Park, Mich.

[73] Assignee: D.A.B. Industries, Madison Heights, Mich.

[21] Appl. No.: 697,158

[22] Filed: Feb. 1, 1985

[51] Int. Cl.$^4$ ............................................. B32B 15/01
[52] U.S. Cl. .................................... 428/653; 420/530; 420/531; 420/537
[58] Field of Search ....................... 420/530, 531, 537; 428/653

[56] References Cited

U.S. PATENT DOCUMENTS

| | | |
|---|---|---|
| 2,026,540 | 1/1936 | Kempf et al. . |
| 2,026,546 | 1/1936 | Kempf et al. . |
| 2,752,240 | 6/1956 | Schluchter . |
| 3,410,331 | 11/1968 | Miller et al. . |
| 3,562,884 | 2/1971 | Webbere . |
| 3,753,695 | 8/1973 | Lloyd . |
| 4,452,866 | 6/1984 | Jamiya et al. . |

Primary Examiner—R. Dean
Attorney, Agent, or Firm—Barnes, Kisselle, Raisch, Choate, Whittemore & Hulbert

[57] ABSTRACT

An aluminum base alloy for use as a bearing material. The alloy contains 4% or more by weight of bismuth. The bismuth content by weight may be up to 8%, and for some purposes as much as 12%. The alloy also contains lead and silicon to enhance bearing surface properties and wear resistance and copper as a strengthening addition. There may be other strengthening and/or hard particles additivies such as nickel, manganese, chromium, antimony and zinc. Tin can be added to improve corrosion resistance.

2 Claims, No Drawings

BEARING MATERIAL

This invention relates to an aluminum base alloy for use as a bearing material, for example in thin shell bearings where the alloy requires to be bonded, as by sintering, casting or rolling, to a steel back.

BACKGROUND AND SUMMARY OF THE INVENTION

Plain bearing materials require good surface properties since they must slide against the mating surface without causing wear to either surface and without 'seizing' i.e. welding to the mating surface. This property usually requires that the alloy is soft and has a low melting point, or contains a low melting point constituent. The alloy also needs to be capable of carrying the load imposed by the mating surface, which is often cyclic in nature, without break-up or fatigue of the bearing alloy. This property usually requires that the alloy be strong and strong alloys are usually hard. A compromise of property requirements in balancing both soft and hard attributes is necessary.

There are three well established aluminum alloys in use today as engine bearing materials each consisting of an aluminum material and a major alloying addition of a soft, low melting point metal. These three alloy systems are aluminum-cadmium, aluminum-tin and aluminum-lead.

The alloys of this invention are the result of a guest to develop an aluminum alloy with a much better combination of bearing properties than those alloys currently available.

According to the present invention, the bearing material comprises aluminum and 4% or more by weight of bismuth. The bismuth content by weight may be up to 8%, and for some purposes as much as 12%. The aluminum may or may not constitute the balance of the material, but will usually constitute at least 50% by weight of the material.

Aluminum-bismuth is an alternative system which has been shown by testing to have superior antiseizure properties to those alloys currently used. The higher the additions of bismuth the better the surface properties become, but there are practical limitations to the amount of bismuth which can be accommodated in an aluminum alloy by a casting process. Because of the liquid immiscibility of aluminum and bismuth, it is not feasible at acceptable temperatures to take more than about 8% of bismuth into solution. Higher bismuth alloys are best made by a sintering process.

Testing has shown, however, that even at bismuth contents as low as 4%–5%, the bearing surface properties are superior to the standard aluminum alloys currently in use. This surface property can be further enhanced by small additions of lead.

In order to impart sufficient wear resistance to the alloy, it is advisable to make small additions of an element or elements which produce a fine dispersion of hard particles in the aluminum matrix. An excellent element for this purpose is silicon which also improves the strength and surface properties.

Another important property of an engine bearing material is that it should withstand the cyclic loads imparted during operation. For this purpose a strengthening addition can be made to the aluminum alloy. One such strengthening addition is copper, which at small additions of around 1% by weight, imparts the necessary strength without deleteriously affecting the surface properties. Other strengthening and/or hard particle forming additives such as nickel, manganese, chromium, zinc, and/or antimony, could be made and small additions of tin could be included to improve corrosion resistance.

The resultant aluminum-bismuth family of alloys have the ability to run in engine bearing environments without the necessity of an expensive overlay plate of lead-tin alloy currently utilized on most engine bearings.

DETAILED DESCRIPTION

Aluminum-bismuth formulations within the following range provide bearing materials capable of acceptable performance:

4%–12% by weight of bismuth
0%–4.5% by weight of silicon
0%–3% by weight of copper
0%–3% by weight of lead
balance aluminum A preferred range would be:

4%–9% by weight of bismuth
1%–4.5% by weight of silicon
0%–1.7% by weight of copper
0%–2.5% by weight of lead
balance aluminum It is believed that the best results overall are obtainable from formulations within the following range:

4.25%–7% by weight of bismuth
2%–2.5% by weight of silicon
0.7%–1.3% by weight of copper
1.25%–2.3% by weight of lead
balance aluminum In any of the formulations set forth above, tere may be corrosion resistant, strengthening and/or hard particles forming additions of any one or more of the materials selected from the group consisting of nickel, manganese, chromium, tin, antimony, and zinc in an amount by weight of each material selected up to 1% if nickel, manganese, or chromium and up to 5% if tin, antimony, or zinc.

The results of actual bearing surface property testing are shown in the table below together with the measurements of the tensile strength of the bearing alloy. The property of seizure resistance was determined using a well-known standard method under laboratory conditions. The sample of bearing material is held against a rotating steel shaft under conditions of sparse lubrication. If the specimen survives 30 minutes at the first load without 'seizing' to the shaft, the load is increased to the next level (by increments of 20 lbs.) and run for a further 30 minutes and so on.

TEST DATA

| Alloy No. | Bi % | Pb % | Si % | Cu % | Other | p.s.i. Tensile Strength | Siezure Load lb |
|---|---|---|---|---|---|---|---|
| 1 | 2.99 | — | 4.32 | 0.02 | — | 16,419 | 40 |
| 2 | 3.34 | — | 0.13 | 0.01 | — | 12,306 | 60 |
| A | — | — | 0.6 | 1.0 | 20% tin | 17,163 | 60 |

-continued

TEST DATA

| Alloy No. | Bi % | Pb % | Si % | Cu % | Other | p.s.i. Tensile Strength | Siezure Load lb |
|---|---|---|---|---|---|---|---|
| B | — | — | 0.5 | 1.0 | 20% tin | 17,243 | 60 |
| 3 | 5.81 | — | 2.11 | 0.01 | — | 16,468 | 60 |
| 4 | 6.49 | — | 2.09 | 0.01 | — | 16,602 | 80 |
| 5 | 10.55 | — | 2.43 | 0.01 | 5.25% Zn | 18,215 | 80 |
| 6 | 8.95 | — | 2.29 | 0.05 | 5.30% Sb | 14,408 | 100 |
| 7 | 8.00 | 1.01 | 1.26 | 0.02 | — | 14,995 | 100 |
| 8 | 6.96 | — | 0.16 | 0.01 | — | 11,722 | 120 |
| 9 | 6.89 | 1.30 | 2.31 | 1.11 | — | 23,579 | 120 |
| 10 | 4.47 | 2.30 | 2.46 | 0.63 | — | 19,362 | 140 |
| 11 | 7.47 | 1.50 | 2.29 | 0.02 | 2% Sb | 13,880 | 160 |

The aluminum-20% tin alloys No. A and No. B are standard materials made by two manufacturers which are currently in use. These aluminum-20% tin alloys are probably the most used aluminum alloys in engine bearings world-wide.

The table shows that the bearing alloys made according to this invention have superior bearing surface properties and tensile strength to the aluminum-20% tin. The table also shows that surface properties and tensile strength are enhanced by small additions of lead.

I claim:

1. A bearing comprising bearing material bonded to a steel backing and without an overlay plate on the exposed surface of the bearing material, said bearing material consisting essentially of
   4.25%–7% by weight of bismuth
   2%–2.5% by weight of silicon
   0.7%–1.3% by weight of copper
   1.25%–2.3% by weight of lead
   balance aluminum.

2. A bearing as defined in claim 1, wherein said bearing material includes any one or more of the materials selected from the group consisting of nickel, manganese, chromium, tin, antimony, and zinc in an amount by weight of each material selected up to 1% if nickel, manganese, or chromium and up to 5% if tin, antomony, or zinc.

* * * * *